United States Patent
Gratton (10) Patent No.: US 11,159,837 B2
(45) Date of Patent: Oct. 26, 2021

(54) VALUE POINT-BASED CONDITIONAL AUTHORIZATION FOR A MEDIA CONTENT RECEIVER DEVICE

(71) Applicant: DISH TECHNOLOGIES LLC, Englewood, CO (US)

(72) Inventor: Max S. Gratton, Lakewood, CO (US)

(73) Assignee: DISH TECHNOLOGIES L.L.C., Englewood, CO (US)

(*) Notice: Subject to any disclaimer, the term of this patent is extended or adjusted under 35 U.S.C. 154(b) by 0 days.

(21) Appl. No.: 14/454,336

(22) Filed: Aug. 7, 2014

(65) Prior Publication Data

US 2016/0044352 A1 Feb. 11, 2016

(51) Int. Cl.
| | |
|---|---|
| H04N 21/2543 | (2011.01) |
| H04N 21/258 | (2011.01) |
| H04N 21/462 | (2011.01) |
| H04N 21/482 | (2011.01) |
| H04N 21/472 | (2011.01) |
| H04N 21/266 | (2011.01) |
| H04N 21/254 | (2011.01) |

(52) U.S. Cl.
CPC ..... *H04N 21/2543* (2013.01); *H04N 21/2541* (2013.01); *H04N 21/25816* (2013.01); *H04N 21/266* (2013.01); *H04N 21/462* (2013.01); *H04N 21/47211* (2013.01); *H04N 21/482* (2013.01)

(58) Field of Classification Search
CPC ......... H04N 21/2543; H04N 21/25816; H04N 21/462; H04N 21/482; H04N 21/2541; H04N 21/266; H04N 21/47211
See application file for complete search history.

(56) References Cited

U.S. PATENT DOCUMENTS

| | | | |
|---|---|---|---|
| 6,057,872 A * | 5/2000 | Candelore | H04N 7/17318 348/E7.071 |
| 7,134,131 B1 | 11/2006 | Hendricks et al. | |
| 7,389,522 B1 * | 6/2008 | Shintani | H04N 7/163 348/E7.061 |
| 7,603,690 B2 | 10/2009 | Knudson | |
| 7,975,279 B1 | 7/2011 | Kudelski et al. | |

(Continued)

FOREIGN PATENT DOCUMENTS

EP    1143727 A1    10/2001

OTHER PUBLICATIONS

European Search Report, EP Application No. 15180129.7, dated Dec. 15, 2015.

*Primary Examiner* — Pinkal R Chokshi
(74) *Attorney, Agent, or Firm* — Lorenz & Kopf, LLP (57) ABSTRACT

A media content receiver device and related operating methods are presented here. An exemplary embodiment of a method of operating the receiver device is performed to maintain a value point balance on behalf of a subscriber. The method continues by receiving channel selection instructions at the receiver device. The channel selection instructions identify at least one content delivery channel. The method continues by adjusting the value point balance in accordance with channel subscription points linked to the identified at least one content delivery channel. A conditional authorization module of the receiver device is configured to authorize subscription to the at least one content delivery channel.

18 Claims, 4 Drawing Sheets

(56) References Cited

U.S. PATENT DOCUMENTS

| | | | |
|---|---|---|---|
| 2002/0170053 A1* | 11/2002 | Peterka | H04N 7/165 725/31 |
| 2003/0174844 A1* | 9/2003 | Candelore | G06Q 20/3674 380/277 |
| 2003/0188316 A1 | 10/2003 | Deprez | |
| 2004/0101138 A1* | 5/2004 | Revital | G06F 21/10 380/210 |
| 2004/0123313 A1* | 6/2004 | Koo | H04N 7/1675 725/31 |
| 2005/0216942 A1* | 9/2005 | Barton | H04N 7/17318 725/97 |
| 2006/0126839 A1* | 6/2006 | Koike | H04H 60/23 380/240 |
| 2006/0155989 A1* | 7/2006 | Nishimoto | H04N 21/2347 713/166 |
| 2006/0168617 A1* | 7/2006 | Maetz | G06Q 30/02 725/35 |
| 2008/0080711 A1* | 4/2008 | Gagnon | H04N 7/1675 380/239 |
| 2008/0313463 A1* | 12/2008 | Depietro | H04N 21/4345 713/170 |
| 2009/0183004 A1* | 7/2009 | Van Der Vegt | H04N 7/165 713/168 |
| 2010/0011387 A1 | 1/2010 | Parisot | |
| 2010/0229200 A1 | 9/2010 | Moreau et al. | |
| 2011/0283307 A1* | 11/2011 | Ooi | H04N 21/26606 725/14 |
| 2012/0131333 A1* | 5/2012 | Zhang | H04N 21/4627 713/156 |
| 2012/0158536 A1 | 6/2012 | Gratton | |
| 2012/0174150 A1* | 7/2012 | Reddy | H04N 21/25841 725/31 |
| 2013/0263174 A1* | 10/2013 | Chaudhari | H04N 21/25435 725/28 |

\* cited by examiner

VALUE POINT-BASED CONDITIONAL AUTHORIZATION FOR A MEDIA CONTENT RECEIVER DEVICE

TECHNICAL FIELD

Embodiments of the subject matter described herein relate generally to content distribution systems, such as video services systems. More particularly, embodiments of the subject matter relate to systems and methodologies for controlling access to subscribed content via a content receiver device.

BACKGROUND

Most television viewers now receive their video signals through a content aggregator such as a cable or satellite television provider. Digital video broadcasting (DVB) systems, such as satellite systems, are generally known. A DVB system that delivers video service to a home will usually include a video services receiver, system, or device, which is commonly known as a set-top box (STB). In the typical instance, encoded television signals are sent via a cable or wireless data link to the viewer's home, where the signals are ultimately decoded in the STB. The decoded signals can then be viewed on a television or other appropriate display as desired by the viewer. Media content, such as video content, may also be delivered to other devices or systems having the appropriate tuner and decoder functionality. In this regard, video content can be delivered to a smart television set, a computing device, a home entertainment device, a video game console, a mobile phone, or the like.

Video services providers typically offer a variety of channel packages to their customers for a monthly subscription fee. The channel packages may include different combinations of bundled channels offered at different pricing tiers. For example, a basic package may include standard network channels and some popular premium channels, while an upper tier package may include hundreds of channels including premium movie and sports channels. Channel bundling, while economical and convenient for the video service providers, may be seen as wasteful or unnecessary from a user perspective, especially if a channel package includes a large number of "filler" channels that are not watched often (if at all).

Accordingly, it is desirable to have a methodology that allows subscribers to more freely subscribe to media content channels in an ongoing manner. In addition, it is desirable to have a content receiver device that can authorize access to media content to which a user has subscribed in a dynamic and ongoing manner. Furthermore, other desirable features and characteristics will become apparent from the subsequent detailed description and the appended claims, taken in conjunction with the accompanying drawings and the foregoing technical field and background.

BRIEF SUMMARY

A method of operating a content receiver device is presented here. An exemplary embodiment of the method maintains a value point balance on behalf of a subscriber. The method continues by receiving channel selection instructions at the content receiver device, the channel selection instructions identifying at least one content delivery channel. The value point balance is adjusted in accordance with channel subscription points linked to the identified at least one content delivery channel. A conditional authorization module of the content receiver device is configured to authorize subscription to the at least one content delivery channel.

A media content receiver device is also presented here. An exemplary embodiment of the device includes: a receiver interface to receive data associated with media content services; a data storage element to maintain a value point balance on behalf of a subscriber associated with the media content receiver device; a conditional authorization module to selectively authorize subscriptions to content delivery channels; and a processor device coupled to the receiver interface, the data storage element, and the conditional authorization module. The processor cooperates with the receiver interface, the data storage element, and the conditional authorization module to receive channel selection instructions identifying at least one content delivery channel, adjust the value point balance in accordance with channel subscription points linked to the identified at least one content delivery channel, and configure the conditional authorization module to authorize subscription to the at least one content delivery channel.

Another embodiment of a media content receiver device is also presented here. The device includes: a receiver interface to receive data associated with media content services; a data storage element to maintain a value point balance on behalf of a subscriber associated with the media content receiver device; a conditional authorization module to selectively authorize subscriptions to content delivery channels; and a processor device coupled to the receiver interface, the data storage element, and the conditional authorization module. The processor cooperates with the receiver interface, the data storage element, and the conditional authorization module to: initialize the value point balance to a beginning balance that corresponds to a recurring subscription fee for a subscriber; obtain initial channel selection instructions identifying a baseline subscription to at least one content delivery channel; reduce the value point balance in accordance with channel subscription points linked to the baseline subscription; configure the conditional authorization module to authorize the baseline subscription; determine that the content receiver device is set to receive content on an additional content delivery channel that is not included in the baseline subscription; further reduce the value point balance in accordance with channel subscription points linked to the additional content delivery channel; and reconfigure the conditional authorization module to authorize subscription to the additional content delivery channel.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, a system or device includes a tangible processor-readable medium to store executable instructions that cause the system or device to perform certain functions, operations, or processes (as described in more detail below). Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

The exemplary embodiments described below relate to a content delivery system such as a satellite or cable television services system. The disclosed subject matter relates to the manner in which end users (customers) select and subscribe to content delivery channels and how the content receiver devices are configured to authorize subscription to selected channels. More specifically, subscription to channels is managed in accordance with a value point balance that is maintained on behalf of the subscriber. The beginning point balance, which may be associated with a monthly subscription fee, is used to "buy" content delivery channels, where each channel has an associated amount of subscription points linked thereto. In accordance with one exemplary embodiment, the beginning point balance is proportional to the monthly subscription fee and the user is allowed to select channels at the beginning of a billing cycle, subject to the current value point balance. Thereafter, the subscriber can repeat the procedure and apply the replenished beginning point balance to select different channels for the next billing cycle (if so desired). In accordance with another embodiment, the value point balance can be dynamically applied at any time to subscribe to channels, even in the middle of a billing cycle. In accordance with other embodiments, a portion of the beginning point balance is used to select a "baseline" package of channels, and the remaining point balance can be used in an ongoing manner to pick and choose additional channels during a billing cycle.

Figure 1:
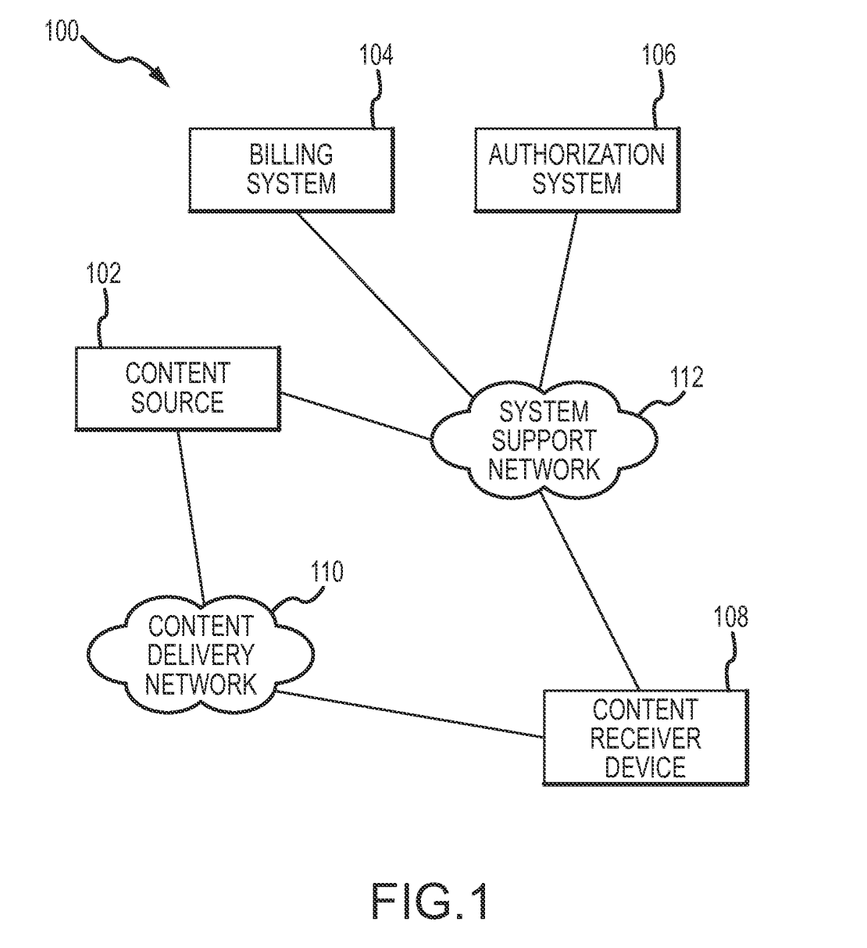
FIG. 1 is a schematic block diagram representation of an embodiment of a content delivery system.

Turning now to the drawings, FIG. 1 is a schematic block diagram representation of an embodiment of a content delivery system 100 that is configured to support the techniques and methodologies described in more detail below. Depending on the embodiment, the system 100 may be implemented as a satellite video services system, a cable video services system, a cellular-based content delivery system, an Internet-based content delivery system, a combination thereof, or the like. The system 100 may include, without limitation: at least one content source 102; a billing system 104; an authorization system 106; and a content receiver device 108. For the embodiment presented here, the content source 102 and the content receiver device 108 communicate with each other using a suitably configured content delivery network 110. In certain embodiments, the content source 102, the billing system 104, the authorization system 106, and the content receiver device 108 communicate with each other using a suitably configured system support network 112. Although FIG. 1 depicts the content delivery network 110 and the system support network 112 as separate and distinct networks, it should be appreciated that they could be one and the same, or they could share some network infrastructure and network communication links if so desired.

The content delivery network 110 and the system support network 112 may be implemented as any digital or other data communications network capable of transmitting content, signaling data, control data, metadata, and the other information between devices, systems, servers, and the like. In various embodiments, the content delivery network 110 and the system support network 112 may each include any number of public or private data connections, links or sub-networks supporting any number of communications protocols. In certain embodiments, a network used by the system 100 may include, without limitation: the Internet; a satellite media distribution network; a cable television network; a cellular telecommunication network; a wired telephone network; or a wired or wireless local area network, such as one or more IEEE 802.3 and/or IEEE 802.11 networks. These and other network protocols and infrastructures can be utilized by the system 100 if so desired.

Although not always required, this description assumes that the content source 102, the billing system 104, and the authorization system are owned, maintained, managed, or controlled by, or are otherwise associated with, an entity or an enterprise such as a satellite video provider, a cable television provider, or an internet television or media provider. In certain situations, the content receiver device 108 may also be owned and operated by the same entity or enterprise (for example, the content receiver device 108 may be a set-top box that is leased or rented to the end user). In other scenarios, the content receiver device 108 may be owned or operated by the end user.

For simplicity, FIG. 1 only shows one content source 102. An embodiment of the content delivery system 100, however, may include or cooperate with any number of content sources (which may be co-located or geographically distributed). Moreover, a given video services provider (e.g., a satellite video provider, a cable television provider, a telecommunication services provider, or the like) could maintain, provide, or otherwise cooperate with any number of content sources 102 designed to support any number of subscribers.

In certain embodiments, the content source 102 may be deployed as a head end facility and/or a satellite uplink facility for the system 100. In some embodiments, the content source 102 may include or cooperate with one or more web-based content delivery applications, services, or providers. In yet other embodiments, the content source 102 may be associated with a cellular service provider such that the content source 102 can delivery media to cellular devices or other types of mobile devices. Regardless of its implementation, the content source 102 is suitably configured to provide media content (e.g., broadcast video content, recorded video content, on-demand video content, audio content, image content, multimedia content, or the like) to end users of the system 100.

As mentioned above, the content source 102 provides media content to the content receiver device 108, using the content delivery network 110 as at least part of the transmission conduit. The content receiver device 108 represents an end user device that is suitably configured to support playback and presentation of the media content provided by the system 100. In this regard, the content receiver device 108 may be realized using any number of device platforms, as appropriate for the particular embodiment. Accordingly, the content receiver device 108 can be realized as any device, system, or apparatus that is capable of receiving signals from the content source 102, decoding or otherwise processing data that conveys media content, and formatting the decoded data for presentation (display) to the user. In practice, the content receiver device 108 may be realized as any of the following, without limitation: a video services receiver (e.g., a set-top box for a satellite or cable television system); a desktop, laptop, or tablet computer device; a television set or monitor; a video game system; a digital video recorder; a CD or DVD player; a piece of home entertainment equipment; a smart appliance; a mobile telephone; an electronic navigation device; a digital media player device; or an onboard vehicle-based entertainment system.

This description relates to a video services implementation where the content source 102 provides video programming on a plurality of channels. In such an implementation, the content receiver device 108 receives programming data, signaling information, and/or other data via the content delivery network 110. The content receiver device 108 then demodulates, decompresses, descrambles, and/or otherwise processes the received digital data (if authorized to do so), and then converts the received data to suitably formatted video signals that can be rendered for viewing by the customer on a display.

The billing system 104 represents the hardware, software, processing logic, and architecture associated with customer billing, invoicing, accounting, and management functions of the system 100. The billing system 104 may be implemented using one or more computer devices, e.g., one or more servers. In addition to routine billing functions, the billing system 104 may be used to keep track of monthly (or any periodic) subscription fees paid by the users of the system 100, along with the content delivery channels that have been subscribed to by the users of the system 100. The billing system 104 may also be used to establish and maintain value point balances on behalf of the users, and to adjust the value point balances as needed to reflect channel subscriptions initiated by the users. For example, the billing system 104 can be used to initialize the beginning value point balance for a user at the start of each billing cycle, and reduce the point balance in response to the selection of content delivery channels by a user of the content receiver device 108. In certain embodiments, the billing system 104 is updated in real-time or substantially real-time in response to channel selections and value point spending processed by the content receiver device 108. In other embodiments, the content receiver device 108 is responsible for maintaining the value point balance, while updating the billing system 104 as needed or in accordance with a predetermined schedule.

The authorization system 106 may be utilized in some embodiments. The authorization system 106 represents the hardware, software, processing logic, and architecture associated with authorization functions of the system 100. The authorization system 106 may be implemented using one or more computer devices, e.g., one or more servers. The authorization system 106 is suitably configured to authorize access to channels to which users have successfully subscribed. Conversely, the authorization system 106 inhibits or prevents user access to unsubscribed channels. For example, if a user of the content receiver device 108 decides to subscribe to Channel YYZ (with a corresponding reduction in the user's value point balance), then the content receiver device 108 may communicate with the authorization system 106 such that the content receiver device 108 will be authorized to receive, decode, or otherwise present content on Channel YYZ to the user.

The authorization system 106 need not be utilized if the authorization functionality is embedded in the content receiver device 108. In this regard, the content receiver device 108 may be suitably configured to conditionally authorize access to those channels to which the user has subscribed. As explained in more detail below, the content receiver device 108 may include or cooperate with a suitably configured conditional authorization module that manages access to channels in accordance with the point-based subscription approach. In practice, the specific manner in which subscribed channels are authorized or approved may vary from one embodiment to another, depending on the particular implementation of the system 100.

Figure 2:
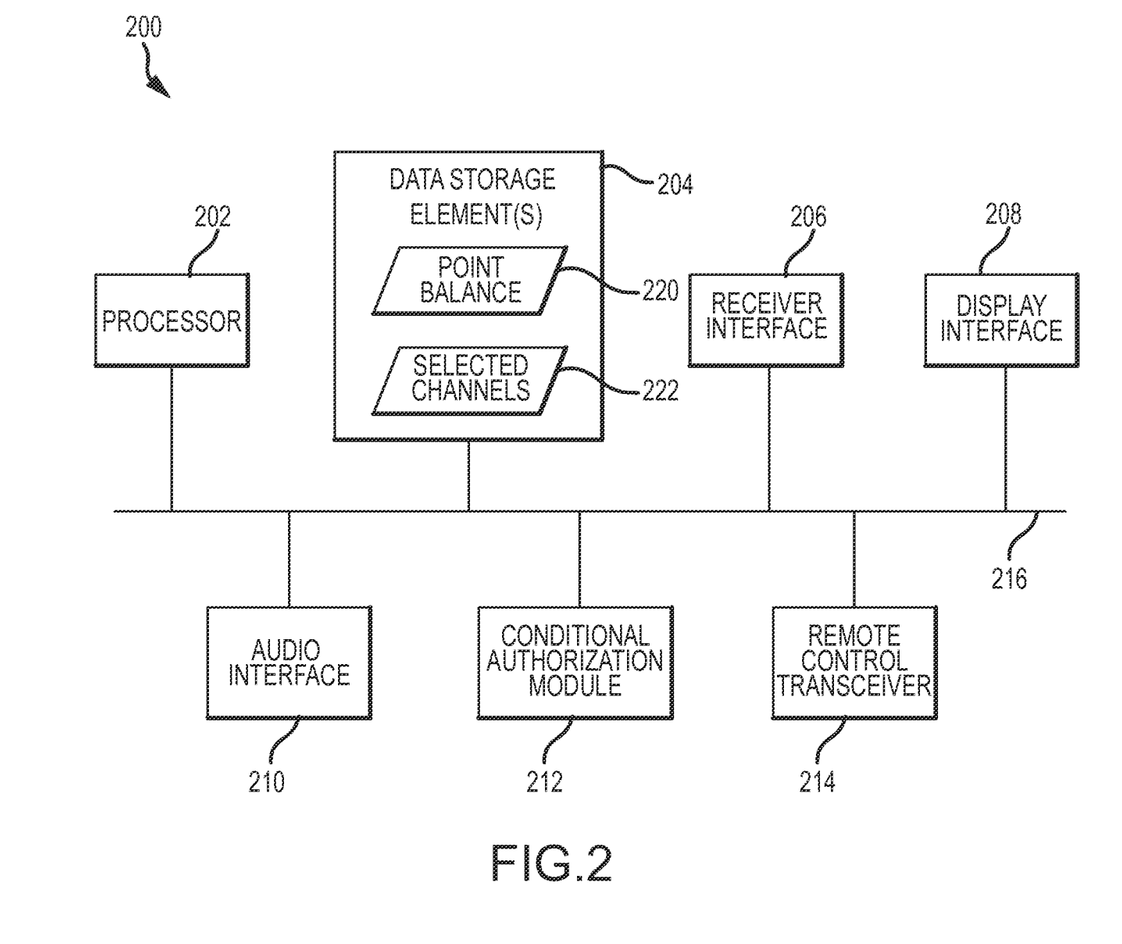
FIG. 2 is a schematic block diagram representation of an embodiment of a content receiver device.

FIG. 2 is a schematic block diagram representation of an embodiment of a content receiver device 200 that is suitable for use in the content delivery system 100 shown in FIG. 1. The content receiver device 200 is designed and configured for providing audio and/or visual content to a user, by way of channel-based selective subscription. The content receiver device 200 may also support a variety of conventional multimedia, entertainment, computing, and/or communication functions (which will not be described in detail here).

The illustrated embodiment of the content receiver device 200 generally includes, without limitation: at least one processor device 202; at least one data storage element 204 having a suitable amount of memory associated therewith; a receiver interface 206; a display interface 208 for a display element; an audio interface 210; a conditional authorization module 212; and a remote control transceiver 214. These components and elements may be coupled together as needed for purposes of interaction and communication using, for example, an appropriate interconnect arrangement or architecture 216. It should be appreciated that the content receiver device 200 represents a "full featured" embodiment that supports various features described herein. In practice, an implementation of the content receiver device 200 need not support all of the enhanced features described here and, therefore, one or more of the elements depicted in FIG. 2 may be omitted from a practical embodiment. Moreover, a practical implementation of the content receiver device 200 will include additional elements and features that support conventional functions and operations.

The processor device 202 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor device 202 may be realized as a microprocessor, a controller, a microcontroller, or a state machine. Moreover, the processor device 202 may be implemented as a combination of computing devices, e.g., a combination of a digital signal processor and a microprocessor, a plurality of microprocessors, one or more microprocessors in conjunction with a digital signal processor core, or any other such configuration.

The data storage elements 204 may be realized using any number of devices, components, or modules, as appropriate to the embodiment. Moreover, the content receiver device 200 could include data storage elements 204 integrated therein and/or data storage elements 204 operatively coupled thereto, as appropriate to the particular embodiment. In practice, a data storage element 204 could be realized as RAM memory, flash memory, EPROM memory, EEPROM memory, registers, a hard disk, a removable disk, or any other form of storage medium known in the art. In certain embodiments, the data storage elements 204 include a hard disk, which may also be used to support integrated DVR functions of the content receiver device 200. The data storage elements 204 can be coupled to the processor device 202 such that the processor device 202 can read information from, and write information to, the data storage elements 204. In the alternative, the data storage elements 204 may be integral to the processor device 202. As an example, the processor device 202 and a data storage element 204 may reside in a suitably designed ASIC.

As depicted in FIG. 2, the data storage elements 204 can be used to maintain and store a value point balance 220 on behalf of a subscriber who is associated with the content receiver device 200. In most typical operating scenarios, the subscriber is the primary owner, operator, or renter of the content receiver device 200. The content receiver device 200 could maintain a plurality of different value point balances 220 as needed to support multiple users or accounts, wherein each user may have a unique name, password, or other identifier that links them to their value point balance 220. In some embodiments, biometrics or image recognition may be used to identify users and an associated account for processing of associated channels and/or value point balances.

The data storage elements 204 can be updated as needed to reflect adjustments in the value point balance 220 in an ongoing manner. As mentioned above, the value point balance 220 represents a "spendable" quantity that the user can apply to subscribe to individual content delivery channels. In this regard, each channel that is available for subscription may have a corresponding channel subscription point value or amount linked thereto. For example, a premium channel may be worth one hundred or more value points, a popular channel may be worth about fifty value points, and less popular channels may be worth only ten points. Of course, the actual point values assigned to the content delivery channels may vary from one embodiment to another, and the values will be determined by managers or administrators of the content delivery system.

Although a variety of different value point schemes could be used, certain preferred embodiments establish a beginning value point balance that corresponds to a monetary subscription fee for the subscriber, e.g., a monthly or other recurring fee that might be governed by a periodic billing schedule of the content service provider. For example, a monthly subscription fee of $100.00 may correspond to 500 value points, while a higher monthly subscription fee of $200.00 may correspond to 1500 value points. It should be appreciated that the number of value points awarded per monetary unit need not be fixed or constant, and that the service provider may allocate points in any desired manner. In some embodiments, unused point values, or a portion thereof, may roll over to subsequent months.

The data storage elements 204 may also be used to maintain and store a list or table of selected channels 222. Although the value point balance 220 and the selected channels 222 are depicted separately, it should be appreciated that the value point balance 220 and the selected channels 222 could actually be stored together in a common data storage element 204. The selected channels 222 are channels that have been authorized for access by the subscriber. In this regard, the selected channels 222 will include channels that have been "purchased" with the user's value points, along with any other channels that have been authorized through other mechanisms. In certain embodiments, the value point balance 220 and the list of selected channels 222 remain static after an initial selection and configuration by the user. In other embodiments, the value point balance 220 and the list of selected channels 222 can be dynamically updated at various times in response to user selection and "purchase" of new channels.

The receiver interface 206 is suitably configured to receive and perform front end processing on signals received by the content receiver device 200. In this regard, the receiver interface 206 can receive data associated with any number of media content services, video services, content delivery channels, etc., including the actual content and data that is used to populate on-screen menus, GUIs, interactive programming interfaces, etc. The receiver interface 206 may leverage conventional design concepts that need not be described in detail here.

The display interface 208 is operatively coupled to a display element (not shown) of the content receiver device 200, or is otherwise associated with one or more display elements that cooperate with the content receiver device 200. The display interface 208 represents the hardware, software, firmware, and processing logic that is utilized to render graphics, images, video, and other visual indicia on the user's display. In this regard, the display interface 208 facilitates the presentation of programs on the display(s) at the customer premises. For example, the display interface 208 is capable of providing graphical interactive programming interfaces for video services, interactive listings of content delivery channels to which the user can subscribe, interactive graphical menus, and other GUIs for display to the user. The display interface 208 may leverage conventional design concepts that need not be described in detail here.

The audio interface 210 is coupled to one or more audio system components (not shown) of the content receiver device 200 and/or to one or more audio system components that cooperate with the content receiver device 200. The audio interface 210 represents the hardware, software, firmware, and processing logic that is utilized to generate and provide audio signals associated with the operation of the content receiver device 200. Depending upon the particular embodiment, the audio interface 210 may be tangibly or wirelessly connected to the audio portion of a television or monitor device, or it may be tangibly or wirelessly connected to a sound system component that cooperates with the television or monitor device, or it may be integrated with the content receiver device 200.

The conditional authorization module 212 represents the hardware, software, firmware, and processing logic that is utilized to provide selective access to certain content delivery channels, while inhibiting or preventing access to other channels. In this regard, the conditional authorization module 212 selectively authorizes subscriptions to content delivery channels that have been "purchased" using the value point balance 220. In practice, the conditional authorization module 212 may employ conventional decoding, decryption, and/or other security mechanisms that can be applied to the content data received by the content receiver device 200. When successfully applied, these mechanisms enable access to the subscribed channels (and/or other authorized channels) while preventing access to any unauthorized channels. Accordingly, the conditional authorization module 212 is configured and reconfigured as needed to authorize the current list of selected channels 222.

The conditional authorization module 212 may be implemented in a variety of ways, as appropriate to the particular embodiment. In certain embodiments, the conditional authorization module 212 is implemented with a secure processor device. In this regard, the conditional authorization module may be realized as a physically distinct processor chip that is separate from the processor device 202. In other embodiments, the conditional authorization module 212 is implemented as a smart card, which may be removable and replaceable if so desired. For such embodiments, the content receiver device 200 includes a suitably configured card interface that establishes physical and electrical connections with the smart card. In yet other embodiments, the conditional authorization module 212 is implemented as a secure memory card (e.g., a secure digital (SC) flash memory card), which may be removable and replaceable if so desired. For such embodiments, the content receiver device 200 includes a suitably configured flash memory slot and an interface that establishes physical and electrical connections with the secure memory card.

The conditional authorization module 212 may be configured, reconfigured, and otherwise managed by the native processing capability of the content receiver device 200 such that channels to which the user has subscribed can be properly decoded, decrypted, or otherwise processed for presentation of content. Alternatively, the conditional authorization module 212 could be configured, reconfigured, and otherwise managed by an "external" network-based system or device, such as the authorization system 106 shown in FIG. 1.

In certain embodiments, the conditional authorization module 212 may be configured to receive Entitlement Management Messages (EMM) from the authorization system 106 that specify one or more channels that the user is authorized to access. For example, when a user requests to access a particular channel for the month, an EMM may be sent by the authorization system 106 that specifies the channel and the authorized duration. In some embodiments, an EMM may specify multiple authorized channels, such as local channels or multiple sports channels which are bundled into a single mini-package for a specified number of value points. If certain channel configurations are typically purchased by a large number of users (e.g., people who purchase a cooking channel also typically purchase a home improvement channel), then an EMM may be utilized in the system to authorized multiple channels for a single user in order to save bandwidth across the network. The conditional authorization module 212 then may receive the EMM, look up the associated channels specified by the mini-package and authorized reception of those channels for a specified period of time.

In certain embodiments, the conditional authorization module 212 may be configured to temporarily authorize access to a channel for a limited duration to provide immediate response to the user, while obtaining an authorization from the authorization system 106 for a longer duration. For example, the user may request to add a particular channel to their account. If the point balance allows for the addition, the conditional authorization module 212 may immediately allow access to the program through an instantaneous EMM (i-EMM) that has a limited duration (e.g., 24 hours or less). The conditional authorization module 212 may then communicate with the billing system 104 and/or authorization system 106 upon a periodic schedule (e.g., every night) to transmit the billing data and/or acquire an EMM that permits access to the channel for a longer period of time (e.g., the remaining portion of the month). In certain embodiments, the authorization system 106 may periodically provide the conditional authorization module 212 with time limited i-EMMs. For example, i-EMMs may be provided nightly that allow a customer service application on a television receiver to temporarily authorized particular programs, shows or mini-packages for the following day. These may be updated daily depending on the broadcast schedule, billing information or other criteria set by the broadcaster.

The remote control transceiver 214 may be used in certain implementations of the content receiver device 200, such as a set-top box deployment. The remote control transceiver 214 performs wireless communication with one or more compatible remote devices, such as a remote control device, a portable computer, an appropriately equipped mobile telephone, or the like. The remote control transceiver 214 enables the user to remotely control various functions of the content receiver device 200, in accordance with well-known techniques and technologies. In certain embodiments, the remote control transceiver 214 is also used to wirelessly receive requests or instructions that are related to the selection of channels for purposes of subscription.

Figure 3:
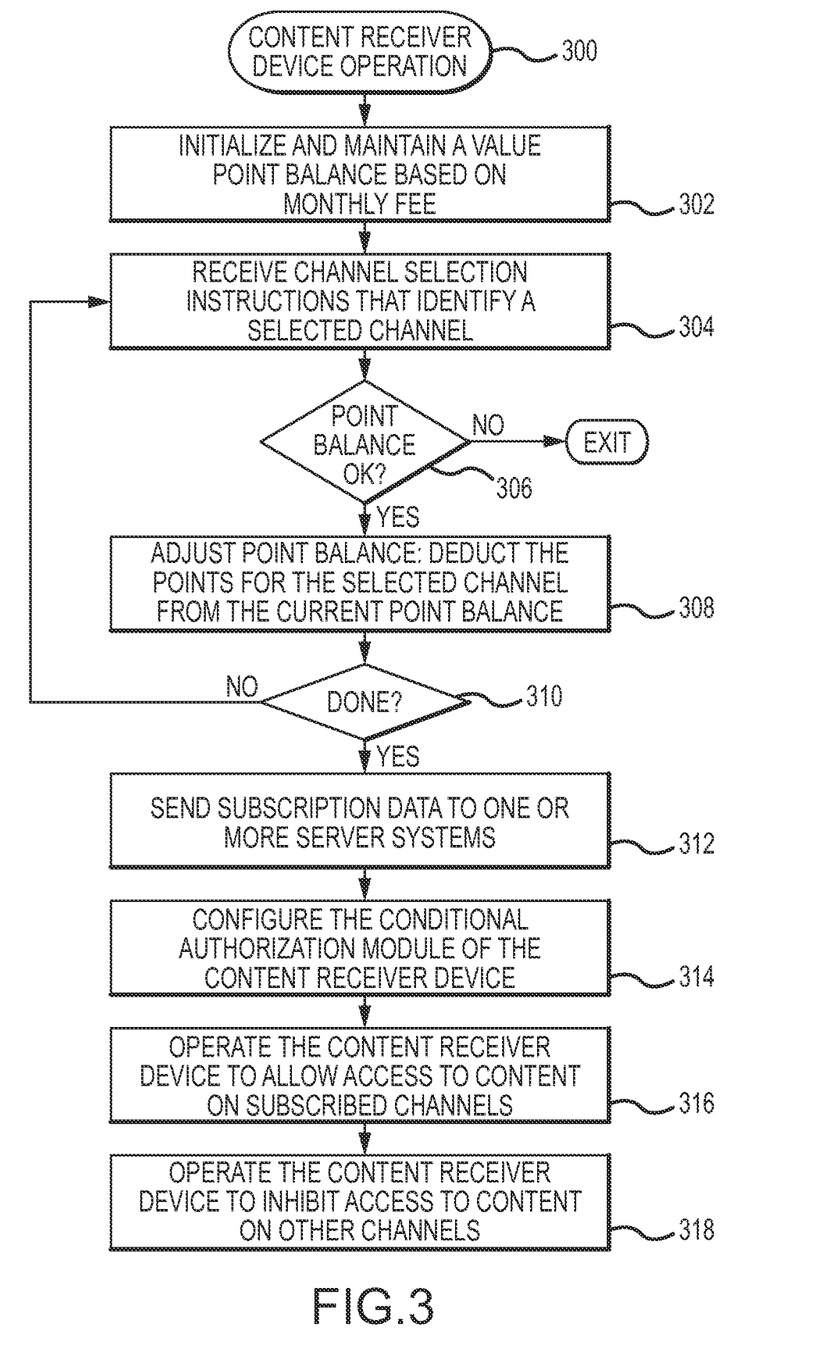
FIG. 3 is a flow chart that illustrates an embodiment of an operating process for a content receiver device.
Figure 4:
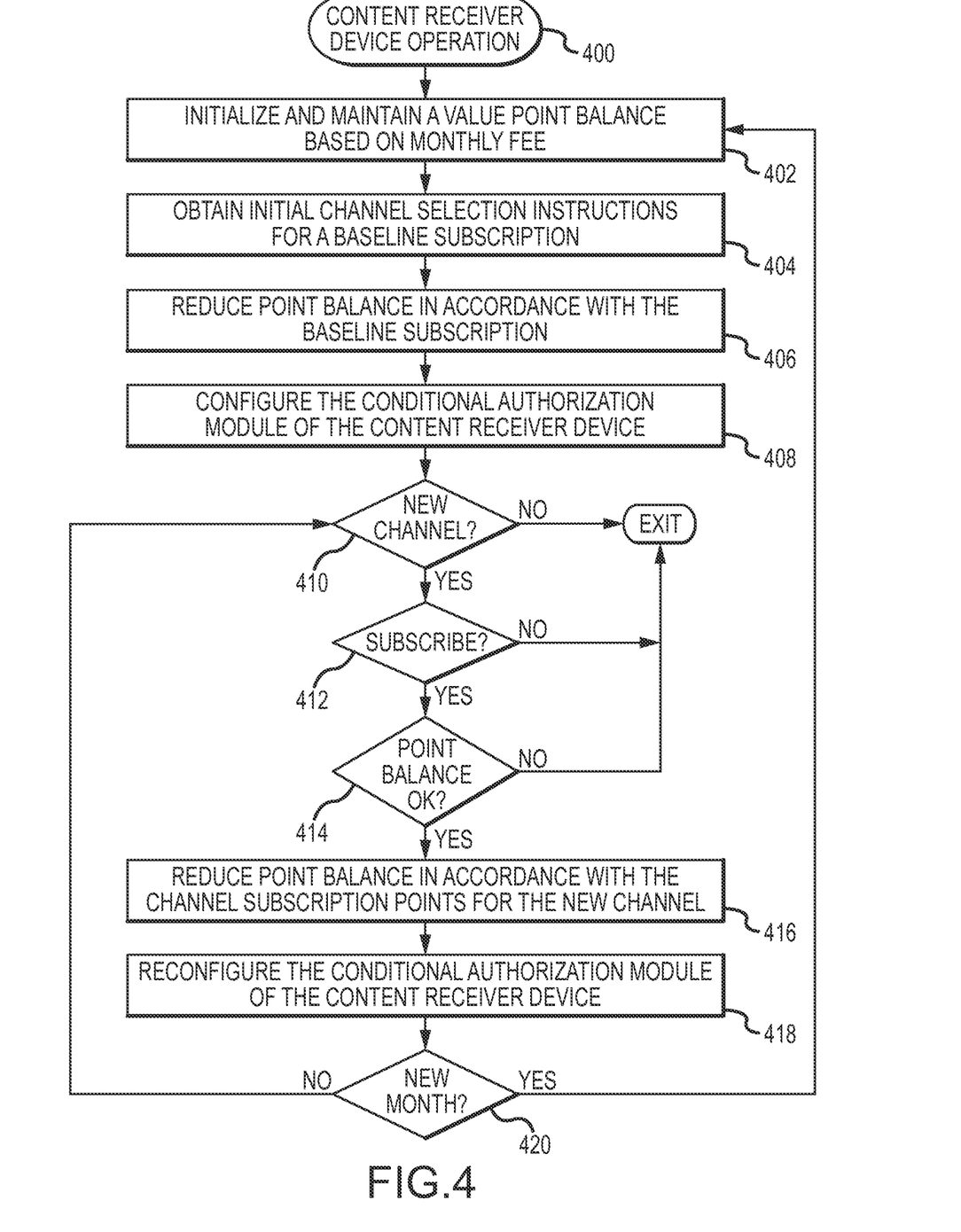
FIG. 4 is a flow chart that illustrates another embodiment of an operating process for a content receiver device.

The content receiver device 200 can be operated in a way that enables the user/subscriber to pick and choose desired content delivery channels, as long as the value point balance 220 is high enough to accommodate the selections. The at least one processor device 202 cooperates with at least the receiver interface 206, the data storage element 204, and the conditional authorization module 212 to carry out certain processes related to the selection and authorization of the channels. In this regard, FIG. 3 is a flow chart that illustrates an embodiment of an operating process 300 for a content receiver device, and FIG. 4 is a flow chart that illustrates another embodiment of an operating process 400 for a content receiver device. The various tasks performed in connection with a process described herein may be performed by software, hardware, firmware, or any combination thereof For illustrative purposes, the description of an operating process may refer to elements mentioned above in connection with FIG. 1 or FIG. 2. In practice, portions of an operating process may be performed by different elements of the described system, e.g., the processor device 202, the data storage element 204, or the conditional authorization module 212. It should be appreciated that an illustrated process may include any number of additional or alternative tasks, the tasks shown in the figures need not be performed in the illustrated order, and an operating process described herein may be incorporated into a more comprehensive procedure or process having additional functionality not described in detail herein. Moreover, one or more of the tasks described for an operating process could be omitted from an embodiment as long as the intended overall functionality remains intact.

Referring now to FIG. 3, the process 300 may begin by initializing beginning value point balance (task 302). This description assumes that task 302 sets the beginning value point balance at the start of a new billing cycle, e.g., at the beginning of a billing month, a calendar month, or the like. Alternatively, task 302 could be performed at any time in the middle of a billing cycle, with applicable prorated adjustments made to the value point balance if so desired. In certain embodiments, task 302 initializes the value point balance to a beginning balance that corresponds to a recurring or periodic monetary subscription fee for the subscriber, which may be governed by the billing schedule designated by the content service provider. The non-limiting example presented here arbitrarily assumes that the monthly fee is $100.00, and that the beginning balance (which corresponds to the $100.00 fee) is 500 points. After initializing the beginning point balance, the process 300 maintains and updates the balance as needed.

For the sake of brevity and ease of description, this example assumes that the content receiver device is initially configured without any authorized channels, i.e., the user has not subscribed to any content delivery channels at the time of initialization. In practice, however, user selections and authorized channels could be saved from one billing cycle to another. Indeed, the process 300 could be performed at the beginning of one billing cycle and thereafter only be performed as needed (i.e., if the subscriber makes changes to the subscribed channels, increases the monthly value point allocation, or the like). The service provider may establish a "grace period" during which subscribers can modify their channel selections for the next month, billing cycle, or recurring period. For example, if billing cycles occur on a calendar month basis, then the service provider may allow its users to change their channel subscriptions during the last week of the previous month.

After initializing the point balance, the content receiver device receives channel selection instructions that identify a selected content delivery channel (task 304). For this particular embodiment, the channel selection instructions are obtained in response to the user manipulating a suitably formatted interactive screen (or any other form of graphical user interface) generated by the content receiver device. For a set-top box implementation, the user can search for, and select, channels using a remote control device. For simplicity and ease of understanding, this example processes channel selections individually. Thus, the process 300 checks whether the current value point balance can accommodate subscription to the selected channel (query task 306). As explained above, each content delivery channel that is eligible for subscription in this manner will have a respective amount of channel subscription points linked thereto. Accordingly, query task 306 compares the designated amount of channel subscription points against the current value point balance. However, it is to be appreciated that in some embodiments, particular channels or programs may be offered to a user for no value of channel subscription points or even a credited amount of subscription points. For example, home shopping channels or infomercials may have no associated point value for viewing, and such channels may even provide the user with a credit of points that may be utilized to purchase other programs. In other embodiments, programs or shows may be offered temporarily for no point value in order to allow the user to preview particular programming It is also to be appreciated that channel or even program subscription points may change periodically, based on amount of time remaining in the subscription period or the particular content available during the period. For example, a user subscribing to a channel later in the month may be charged less subscription points based on a pro-rated basis. Likewise, users may be charged less subscription points for a channel during the summer or other off-season times when new programming is sparse or particular popular programs are not available on the channel.

If the point balance is insufficient (the "No" branch of query task 306), then the process 300 exits. Exiting in this manner may cause the process 300 to generate a notification to inform the user that the point balance is too low. In addition, the process 300 may return to task 304 if the user selects a different channel having less channel subscription points associated therewith, or prompt the user to upgrade their subscription. This example assumes that the current value point balance can accommodate the selected channel (the "Yes" branch of query task 306). Accordingly, the process 300 may continue and adjust the value point balance in accordance with the designated amount of channel subscription points for the selected channel (task 308). For this particular embodiment, task 308 reduces the current value point balance by an amount equal to the channel subscription points, and saves the updated value point balance. It should be appreciated that other adjustment schemes could be implemented if so desired, and that simple subtraction need not be utilized in all embodiments.

The process 300 may allow the user to select different channels until the value point balance is too low. Moreover, the user can end the channel selection routine at any time (query task 310), regardless of the current value point balance. If the user selects another channel (the "No" branch of query task 310), then the process 300 returns to task 304 to handle the new selection in the manner described above. If channel selection is complete (the "Yes" branch of query task 310), then the process 300 may continue by managing the selected channels in an appropriate manner. As one non-limiting example, the process 300 may continue by sending subscription data to one or more server systems (task 312), where the subscription data indicates the channels selected, the amount of value points spent, the current value point balance, and/or other information that relates to the current subscription status of the content receiver device. In this regard, task 312 may be associated with the communication of data to the content source 102, the billing system 104 and/or the authorization system 106 shown in FIG. 1. Thus, a server-based or other enterprise-based system may be utilized to regulate channel subscriptions to any number of content receiver devices.

The information communicated at task 312 is processed in an appropriate manner to generate and provide authorization data to the content receiver device. The authorization data may include or convey any of the following, without limitation: decryption keys; passwords; hash values; channel identifiers; code words; EMMs; and/or i-EMMs. The authorization data can be used to configure the conditional authorization module of the content receiver device (task 314). The conditional authorization module may be updated with the authorization data to authorize subscription to the content delivery channels that have been selected (i.e., the channels for which value points have been expended).

Additionally or alternatively, task 314 may configure the conditional authorization module to inhibit subscriber access to content delivery channels other than those that have been selected.

In alternative embodiments, the content delivery device authorizes the subscription to the selected channels using native functionality, such as using i-EMMs. In other words, the content delivery device need not rely on communication with a server-based or network-based component to authorize the selected channels. In such implementations, the content delivery device may perform a self-authorization routine and, thereafter, communicate a report or confirmation data to the billing system 104, the authorization system 106, or the like.

After the process 300 configures the conditional authorization module, the content receiver device is operated in a manner that allows access to content on the subscribed channels (task 316), and in a manner that inhibits/prevents access to content on other channels (task 318). Depending on the particular service provider, the process 300 may be performed at or near the beginning of each billing cycle, or it could be performed during a billing cycle. In accordance with a simple implementation, a user is given the opportunity to apply the beginning value point balance at the beginning of each month or billing cycle, and the user must select channels during a designated selection period. After the selection period closes, the user will not be able to select additional channels. In accordance with another implementation, the value point balance is initialized at the beginning of each month or billing cycle, and the user is allowed to spend the value points at any time prior to the next month or billing cycle. Thus, the user may apply half of the starting value point balance at the beginning of the month, and then apply some or all of the remaining value points when needed, such as to watch a particular program on a particular channel. In some embodiments, users may be debited for particular channels based on the number of days the user accessed particular channels during the month. It is also to be appreciated that content may be sold to users in mini-packages, such as all local channels or all sports channels, as well as individual programs, any of which may be selected by the user in advance or at any time during the billing cycle. It is to be appreciated that point values may dynamically change during the billing cycle to encourage particular viewing habits. For example, program or channel point values may increase closer to viewing of particular hot programs in order to encourage users to set their viewing preferences earlier in the month or maintain certain viewing preferences and purchases each month.

Referring now to FIG. 4, the operating process 400 represents an alternative embodiment that contemplates an ongoing and dynamic channel selection scheme. Some of the tasks, features, and functions of the process 400 are similar or identical to those described above for the process 300. For the sake of brevity, similar/identical features will not be redundantly described here in the context of the process 400.

The process 400 initializes and maintains a value point balance on behalf of the subscriber (task 402), and obtains initial channel selection instructions for a baseline subscription to at least one content delivery channel (task 404). The initial channel selection instructions identify the initially selected channels in the manner described above for the process 300. The process 400 continues by reducing the value point balance in accordance with the channel subscription points that are linked to the baseline subscription (task 406). This example assumes that the baseline subscription does not consume all of the value points, and that enough value points remain to support the subsequent selection and subscription to at least one additional content delivery channel. Next, the process 400 configures the conditional authorization module of the content receiver device in a way that authorizes the baseline subscription (task 408). At this point, the content receiver device can be operated to provide access to the content on the channels included in the baseline subscription.

After completing the initial configuration at task 408, the process 400 may determine whether the content receiver device is set or tuned to receive content on an additional content delivery channel, i.e., a new channel that is not part of the baseline subscription (query task 410). If not (the "No" branch of query task 410), then the process 400 may exit or continue monitoring to detect when the content receiver device is set to a new channel. If a new channel is detected (the "Yes" branch of query task 410), then the process 400 continues by checking whether to offer a subscription to the new channel (query task 412). Query task 412 may be associated with a confirmation or instruction received from the user. For example, if the user tunes to a new channel, the process 400 may generate a notice or a pop-up message asking the user to confirm whether or not a subscription to the new channel is desired. If the process 400 detects a confirmation to subscribe to the additional content delivery channel, then the "Yes" branch of query task 412 is followed. As another example, if the user tunes to a new channel, the process 400 may allow the user to preview the new channel for a short period of time. If the process 400 detects that the content receiver device has been set to receive content on the additional channel continuously for at least a minimum length of time, then the "Yes" branch of query task 412 is followed (under the assumption that the user is interested in subscribing to the new channel).

If a subscription to the new channel will not be performed (the "No" branch of query task 412), then the process 400 may exit or continue monitoring to detect when the content receiver device is again tuned to a new channel. This example assumes that the process 400 intends to subscribe to the new channel (the "Yes" branch of query task 412). Accordingly, the process 400 continues by checking the current value point balance (query task 414) to confirm that the point balance can accommodate subscription to the additional content delivery channel. If the existing value point balance is insufficient (the "No" branch of query task 414), then the process 400 may exit or continue monitoring to detect when the content receiver device is again tuned to a new channel.

This example assumes that the value point balance is sufficient (the "Yes" branch of query task 414). Accordingly, the process 400 continues by changing the value point balance in accordance with the subscription points that are linked to the new channel (task 416). For this particular embodiment, the value point balance is reduced by an amount equal to the designated subscription points, and the conditional authorization module is reconfigured (task 418) to authorize subscription to the additional content delivery channel. In some embodiments, the user may also be prompted to add a selected channel to their baseline subscription for use in subsequent billing cycles.

As explained above, the subscriber can dynamically add more channels to the subscription in an ongoing basis during the month or billing cycle, as long as the value point balance is high enough. If the process 400 detects the beginning of the next month or billing cycle (the "Yes" branch of query task 420), then task 402 can be re-entered to initialize the point balance and to allow the user to set the baseline subscription. Alternatively, if the baseline subscription is intended to remain fixed for an extended period of time, then the process 400 could be re-entered at task 408. The "No" branch of query task 420 indicates that the process 400 may continue to monitor for ongoing subscriptions to new channels during the current month or billing cycle. As depicted in FIG. 4, the "No" branch of query task 420 may lead back to query task 410 to continue checking for new channels.

The embodiments described above represent a simple implementation where one value point balance is maintained for the content receiver device, on behalf of one subscriber, one family, one company, etc. In alternative embodiments, multiple value point balances can be maintained and adjusted individually to accommodate a plurality of different users. For example, each member of a household could have a respective value point balance that allows individualized subscription to different channels. Moreover, passwords or other login schemes could be implemented to limit, regulate, or otherwise control the channel subscription procedure as applied to different users. Thus, the system could be designed to accommodate parental control schemes or to otherwise restrict the number of channels and/or the type of channels to which a child can subscribe.

The exemplary implementation described above utilizes the content receiver device as the user interface for purposes of viewing and selecting channels for the subscription. Alternatively or additionally, the service provider may support other methodologies that enable the user to select channels. For example, the service provider could maintain a website that supports a browser-based user interface that allows the user to make channel subscription selections and confirmations using any web-enabled computing device. As another example, the service provider may support a voice response system that allows the user to make channel subscription selections during a telephone call to a designated service number. In such embodiments, the user could enter channel selections using the keypad of the telephone device. As yet another example, the service provider may release a mobile app that accommodates the point-based subscription methodology described here. The mobile app may allow the user to browse available channels, make subscription selections, view the current point balance, purchase additional value points to replenish the point balance, etc.

The foregoing description refers to the selection of content delivery channels for subscription purposes. It should be appreciated that the methodology described above may also be implemented in an equivalent manner to accommodate the selection and individual subscription to content provided on a channel. For example, a user could be allowed to apply his value point balance to subscribe to certain programs, shows, or series carried on a designated content delivery channel. Of course, the content delivery device and/or the cooperating network-based systems and components may need to be modified to accommodate the individualized authorization of program titles. In other embodiments, the user may be provided with a baseline subscription and additional points to use for purchase of certain channels. For example, a baseline subscription may include local channels, government access, shopping programs, as well as a balance of points which may be used for selection of other programs.

While at least one exemplary embodiment has been presented in the foregoing detailed description, it should also be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method executable by a content receiver device that is associated with a subscriber to grant conditional authorization to view a television channel that is received by the content receiver device, the method comprising:

receiving channel selection instructions at the content receiver device, the channel selection instructions identifying the television channel, wherein the television channel is received via a television broadcast received via a television receiver interface of the content receiver device;

receiving a daily broadcast describing a predetermined number of instantaneous electronic management message (iEMMs) via the television receiver interface;

adjusting an electronic value point balance maintained by the content receiver device for the following day in response to the number of i-EMMs described in the daily broadcast;

in response to the channel selection instructions, the content receiver device comparing the electronic value point balance stored by the content receiver device to channel subscription points linked to the television channel identified by the channel selection instructions;

if the content receiver device determines that the electronic value point balance exceeds the channel subscription points stored by the content receiver device for the television channel identified by the channel selection instructions, the content receiver device generating an iEMM from said predeteremined number of iEMMs independent of an external authorization system that authorizes content to be decoded by the content receiver device and providing the iEMM generated by the content receiver device to a secure conditional authorization module of the content receiver device that temporarily grants the content receiver device access to the television channel received by the content receiver device to thereby self-authorize subsequent presentation of programs broadcast on the television channel identified by the channel selection instructions for only the remainder of the day;

after providing the iEMM and prior to the end of the day, the content receiver device contacting the external authorization system to request an electronic management message from the external authorization system on a periodic basis to authorize continued access to the television channel after the day has expired to thereby request the external authorization system to generate an electronic management message for the content receiver device to be included in an upcoming television broadcast; and if the external authorization system approves the request to generate the electronic management message for the content receiver device, subsequently receiving the electronic management message requested by the content receiver device that is included in the television broadcast via the television receiver interface of the content receiver device, and the content receiver device processing the received electronic management message by the secure conditional authorization module to extend access to the television channel after the day is over.

2. The method of claim 1, wherein:

the television channel is one of a plurality of different content delivery channels;

each of the plurality of different content delivery channels has a respective amount of channel subscription points linked thereto; and the content receiver device adjusts the value point balance in accordance with the respective amount of channel subscription points linked to each of the plurality of different content delivery channels.

3. The method of claim 1, wherein the content receiver device configures the secure conditional authorization module to inhibit subscriber access to content delivery channels other than the television channel authorized for subscription.

4. The method of claim 1, further comprising:

after configuring the secure conditional authorization module to authorize subscription to the television channel, the content receiver device determining that the content receiver device is set to receive content on an additional content delivery channel;

the content receiver device changing the value point balance in accordance with channel subscription points linked to the additional content delivery channel; and the content receiver device reconfiguring the secure conditional authorization module to authorize subscription to the additional content delivery channel.

5. The method of claim 4, further comprising:

detecting a confirmation to subscribe to the additional content delivery channel;

wherein changing the value point balance and reconfiguring the secure conditional authorization module are performed in response to the detecting.

6. The method of claim 4, further comprising:

detecting that the content receiver device has been set to receive content on the additional content delivery channel continuously for at least a minimum length of time;

wherein changing the value point balance and reconfiguring the secure conditional authorization module are performed in response to the detecting.

7. A media content receiver device comprising:

a receiver interface to receive a plurality of television channels as a television broadcast;

a data storage element to maintain an electronic value point balance on behalf of a subscriber associated with the media content receiver device;

a secure conditional authorization module to selectively authorize subscriptions to the television channels that are received by the receiver interface; and a processor device coupled to the receiver interface, the data storage element, and the secure conditional authorization module, wherein the processor cooperates with the receiver interface, the data storage element, and the secure conditional authorization module to:

receive a daily broadcast via the receiver interface, the daily broadcast describing a predetermined number of allowed instantaneous electronic management messages (iEMMs);

adjust the electronic value point balance for the following day in response to the number of allowed iEMMs described in the daily broadcast;

receive channel selection instructions at the content receiver device, the channel selection instructions identifying at least one of the plurality of television channels that is selected by the subscriber;

in response to the channel selection instructions, compare the electronic value point balance stored by the data storage element to channel subscription points that are linked to the identified at least one content delivery channel;

if the electronic value point balance exceeds the channel subscription points stored for the selected at least one content delivery channel, generate an iEMM from said predeteremined number of iEMMs independent of an external authorization system, wherein the iEMM generated by the content receiver device is provided to the secure conditional authorization module to direct the secure conditional authorization module to temporarily grant the content receiver device access to the television channel that is selected by the subscriber and thereby self-authorize subsequent viewing of programs broadcast on the television channel by the subscriber for only a temporary time period corresponding to the remainder of the day;

after providing the iEMM and prior to the end of the temporary time period, the content receiver device contacting the external authorization system on a regular periodic basis via a network connection other than the receiver interface to request an electronic management message for continued access to the television channel after the temporary time period has expired to thereby request the external authorization system to generate an electronic management message for the content receiver device to be included in an upcoming television broadcast; and if the external authorization system approves the request to generate the electronic management message for the content receiver device, subsequently receiving the electronic management message requested by the content receiver device as part of the television broadcast received via the receiver interface of the content receiver device and processing the received electronic management message by the secure conditional authorization module to extend access to the television channel after the day is over, wherein the content receiver device receives a predetermined number of i-EMMs via the television receiver interface on a nightly basis to thereby allow the television receiver to temporarily authorize particular television channels for the following day.

8. The media content receiver device of claim 7, wherein:

each of the plurality of different television channels has a respective amount of channel subscription points linked thereto; and the value point balance is adjusted in accordance with the respective amount of channel subscription points linked to each of the plurality of different television channels.

9. The media content receiver device of claim 7, wherein the secure conditional authorization module is configured to inhibit subscriber access to the television channels other than the television channel authorized for subscription.

10. The media content delivery device of claim 7, wherein the processor cooperates with the receiver interface, the data storage element, and the secure conditional authorization module to:

determine that the content receiver device is set to receive content on an additional one of the plurality of television channels, wherein the determination is performed after configuring the conditional authorization module to authorize subscription to the selected television channel;

change the value point balance in accordance with channel subscription points linked to the additional television channel; and reconfigure the conditional authorization module to authorize subscription to the additional television channel.

11. The media content receiver device of claim 7, wherein the conditional authorization module is implemented as a secure processor device.

12. The media content receiver device of claim 7, wherein the conditional authorization module is implemented as a removable smart card.

13. A media content receiver device comprising:
a receiver interface to receive a plurality of television channels as a television broadcast;
a communications interface to communicate with an external authorization system via a network that is separate from the television broadcast;
a data storage element to maintain a value point balance on behalf of a subscriber associated with the media content receiver device;
a secure conditional authorization module to selectively authorize subscriptions to the television channels received by the receiver interface; and
a processor device coupled to the receiver interface, the data storage element, and the conditional authorization module, wherein the processor cooperates with the receiver interface, the data storage element, the network interface and the conditional authorization module to:
receive a daily broadcast via the receiver interface, the daily broadcast describing a predetermined number of allowed instantaneous electronic management messages (iEMMs);
adjust the electronic value point balance for the following day in response to the number of allowed iEMMs described in the daily broadcast;
receive channel selection instructions at the content receiver device, the channel selection instructions identifying at least one television channel of the television broadcast that is selected by the subscriber;
in response to the channel selection instructions, compare the electronic value point balance stored by the data storage element to channel subscription points that are linked to the identified at least one content delivery channel; and
if the electronic value point balance exceeds the channel subscription points stored for the selected at least one content delivery channel:
generate an iEMM from said predeteremined number of iEMMs that is provided to the secure conditional authorization module, wherein the iEMM generated by the processor directs the secure conditional authorization module to grant the content receiver device access to the at least one television channel for only a temporary period of time corresponding to the remainder of the day, wherein the iEMM is generated by the processor independent of the external authorization system; and
contact an external authorization system on a regular periodic basis via the communications interface to request the external authorization system to generate an electronic management message from the authorization system to be included in a television broadcast, wherein the requested electronic management message is received by the content receiver device as part of the television broadcast received via the receiver interface at a later time if the external authorization system approves the request to generate the electronic management message for the content receiver device, and wherein the received electronic management message is processed by the secure conditional authorization module to extend access to the at least one television channel after the day is over and thereby allow subsequent viewing of programs broadcast on the at least one television channel by the subscriber, wherein the content receiver device receives a predetermined number of i-EMMs via the television receiver interface on a nightly basis to thereby allow the television receiver to temporarily authorize particular television channels for the following day.

14. The media content receiver device of claim 13, wherein the processor cooperates with the receiver interface, the data storage element, and the secure conditional authorization module to:
detect a confirmation to subscribe to the additional television channel;
wherein further reducing the value point balance and reconfiguring the secure conditional authorization module are performed in response to the detecting.

15. The media content receiver device of claim 13, wherein the processor cooperates with the receiver interface, the data storage element, and the secure conditional authorization module to:
detect that the content receiver device has been set to receive content on the additional television channel continuously for at least a minimum length of time;
wherein further reducing the value point balance and reconfiguring the secure conditional authorization module are performed in response to the detecting.

16. The media content receiver device of claim 13, wherein the secure conditional authorization module is reconfigured to inhibit subscriber access to television channels other than the at least one television channel of the baseline subscription, and other than the additional television channel.

17. The media content receiver device of claim 13, wherein the processor cooperates with the receiver interface, the data storage element, and the secure conditional authorization module to:
confirm that the value point balance can accommodate subscription to the additional television channel;
wherein further reducing the value point balance and reconfiguring the secure conditional authorization module are performed in response to the confirming.

18. The method of claim 1 wherein the content receiver device requests the electronic management message from the external authorization system via a data connection that is received separately from the television receiver interface.

* * * * *